United States Patent [19]

Kassai

[11] Patent Number: 4,570,288
[45] Date of Patent: Feb. 18, 1986

[54] SPRING SUPPORTED CASTER HAVING A DISENGAGEABLE SWIVEL LOCK

[75] Inventor: Kenzou Kassai, Osaka, Japan

[73] Assignee: Kassai Kabushikikaisha, Osaka, Japan

[21] Appl. No.: 669,536

[22] Filed: Nov. 8, 1984

[51] Int. Cl.⁴ .............................................. B60B 33/02
[52] U.S. Cl. ........................................ 16/35 R; 16/44
[58] Field of Search ................ 16/44, 35 R; 188/1.12

[56] References Cited

U.S. PATENT DOCUMENTS

| 2,942,290 | 6/1960 | Segal | 16/35 R |
| 4,184,227 | 1/1980 | Propst et al. | 16/35 R |
| 4,453,287 | 6/1984 | Kassai | 16/35 R |
| 4,491,335 | 1/1985 | Evron | 16/44 X |

FOREIGN PATENT DOCUMENTS 2500797 9/1982 France ................ 16/35 R

Primary Examiner—Fred Silverberg
Attorney, Agent, or Firm—W. G. Fasse; D. H. Kane, Jr.

[57] ABSTRACT

The lower end of each of the front legs (1) of a baby carriage is fabricated of a hollow pipe and vertically directed. A rotary yoke (13) supporting a wheel (15) is held by and attached to the front leg (1) to surround the lower end of the front leg (1) so that it is rotatable around the axis of the lower end of the front leg (1). The rotary yoke (13) is also vertically movable and, when subjected to the action of a cushion spring (6) received in the lower end of the front leg (1), allows the cushioning action to be exerted. Further, there is provided an operating lever (22) for selectively inhibiting the rotary yoke (13) from rotating to change the direction of the wheel (15).

6 Claims, 4 Drawing Figures

SPRING SUPPORTED CASTER HAVING A DISENGAGEABLE SWIVEL LOCK

BACKGROUND OF THE INVENTION

This invention relates to a caster to be attached to the lower end of a leg of a baby carriage, and more particularly it relates to a caster having a cushioning effect.

Casters are sometimes attached to the front legs of a baby carriage, for example, to enable the baby carriage to change its direction of travel with ease even in a narrow passage.

On the other hand, occasionally, a cushioning device is installed in a region where a wheel of a baby carriage is attached, in order to alleviate a shock the baby carriage receives from the surface unevenness of a road or the like so that the baby in the baby carriage may not be greatly influenced.

Further, there has been proposed a baby carriage whose legs are provided with casters having a cushioning effect to satisfy both requirements of good steerability and riding comfort.

However, conventional casters having a cushioning effect are unavoidably complicated in construction because of the added function. As a result, the area of the baby carriage where such caster is to be attached is enlarged, going counter to the trend toward reducing the weight of baby carriages.

SUMMARY OF THE INVENTION

Accordingly, an object of this invention is to provide a caster having a cushioning effect for baby carriages which has a relatively small number of parts and is simple in construction.

The invention is characterized in that while improving a leg of a baby carriage, the lower end of said leg is designed to function as part of a caster. More particularly, at least the lower end of the leg is fabricated of a hollow pipe and vertically directed. The use of a hollow pipe allows reception of a cushion spring, while the vertical directing provides a rotary shaft for rotation of the yoke of the caster. The rotary yoke supports the axle of the wheel at a position deviated from the central axis of the lower end of the leg and is held by the lower end of the leg and installed to surround the lower end of the leg so that it is rotatable around the central axis of the lower end of the leg. The rotary yoke is also adapted to be vertically movable. This vertical movement is associated with the cushioning effect. The lower end of the leg is provided with a vertically extending elongated hole. Further, a cushion effect applying member extends outwardly from within the lower end of the leg through the elongated hole so as to engage the rotary yoke from above. The cushion spring is installed in the lower end of the leg and provides a downward force on the cushion effect applying member.

According to this invention, since the leg of the baby carriage serves as a part constituting the caster, the number of parts is reduced and the constructions is simplified. Further, since the hollow space of the lower end of the leg is utilized to receive the cushion spring therein, there is almost no problem of the cushion spring rusting or gathering dust, and hence the life of the cushion spring itself can be prolonged.

These objects and other objects, features, aspects and advantages of the present invention will become more apparent from the following detailed description of the present invention when taken in conjunction with the accompanying drawings.

BRIEF DESCRIPTION OF THE DRAWINGS

The drawings are for the purpose of explaining an embodiment of the invention.

DESCRIPTION OF THE PREFERRED EMBODIMENTS

A caster for baby carriages according to the invention can be applied to any of the legs of a baby carriage, but in an embodiment to be described below, it is attached to each front leg of a baby carriage.

Figure 2:
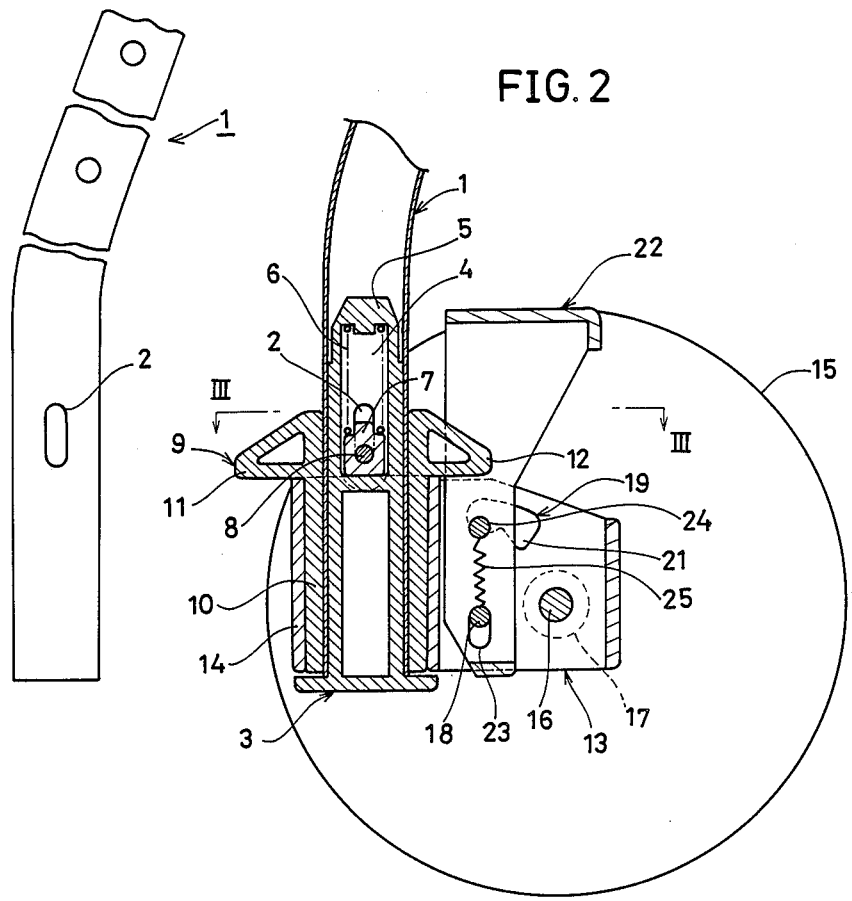
FIG. 2 is a central vertical sectional view showing the assembled state of an embodiment of the invention, illustrating a state in which the inherent function of the caster is stopped.
Figure 3:
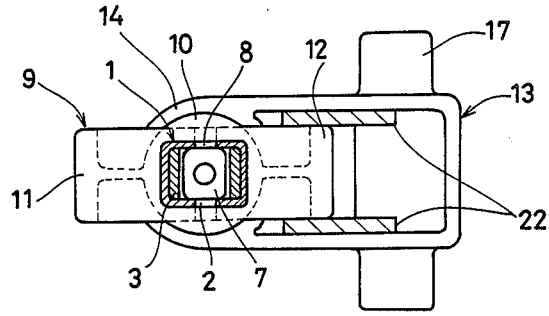
FIG. 3 is a sectional view taken along the line III—III of FIG. 2.

The drawings are for the purpose of explaining an embodiment of the invention. In the illustrated embodiment, the caster is designed so that its inherent function of automatically changing the direction of travel of the wheel is selectively stopped or revived. In FIGS. 2 and 3, the caster is in its function stopped state, while in FIG. 4 it is in its function revived state.

Figure 1:
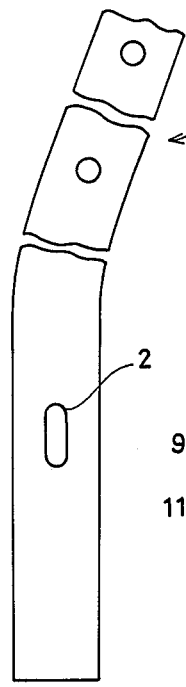
FIG. 1 is a side view showing a portion of a front leg 1 of a baby carriage.

Referring to FIG. 1, a portion of a front leg 1, which is one of the legs of a baby carriage, is shown. The front leg 1 is fabricated of a hollow pipe as a whole. In addition only the lower end of the front leg 1 may be formed of a hollow pipe. The shape of the front leg 1 is determined according to the shape of the baby carriage, but at least the lower end thereof is designed to direct upward. The lower end is provided with vertically extending elongated holes 2.

Figure 4:
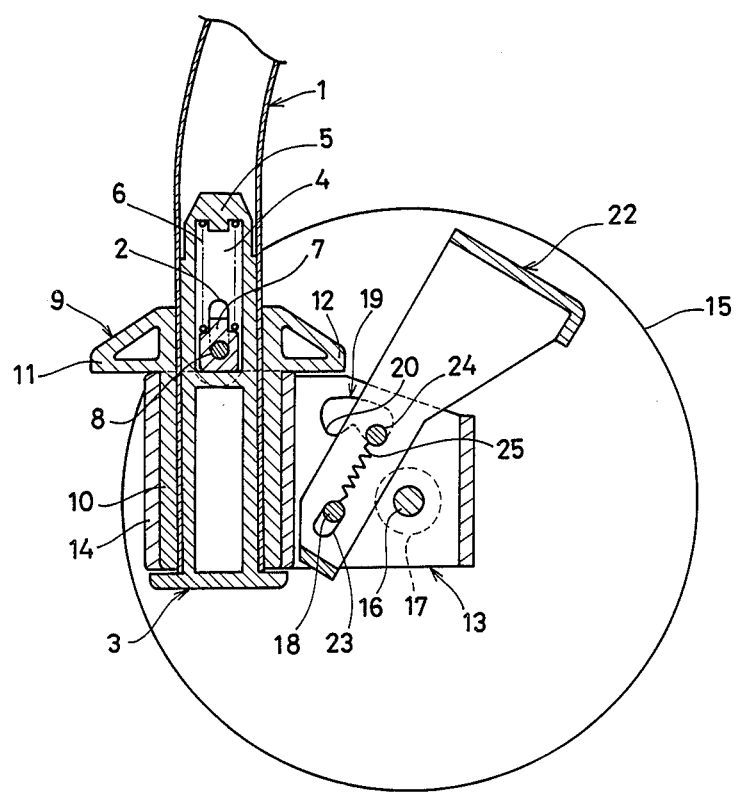
FIG. 4 is a view similar to FIG. 2, but showing a state in which the inherent function of the caster is revived.

FIGS. 2 and 4 show aforesaid mutually different states, but each showing a central vertical sectional view. FIG. 3 is a sectional view taken along the line III—III of FIG. 2.

The front leg 1, as best shown in FIG. 3, is fabricated of a quadrangular pipe. A pipe end 3 is inserted into the front leg 1 from below and fixed to the front leg 1. The upper portion of the pipe end 3 is formed with a space 4 which transversely extends therethrough from side to side, as viewed in FIG. 2, the upper end of said space 4 being defined by a spring stopper 5. Disposed in the front leg 1 is a cushion spring 6 in the form of a compression spring housed in the space 4, with its upper end abutting against the spring stopper 5. The lower end of the cushion spring 6 engages a spring engaging body 7. A connecting pin 8 extends through the spring engaging body 7, said connecting pin 8 extending through said elongated holes 2 to the outside of the front leg 1.

A slider 9 is positioned on the outer periphery of the lower end of the front leg 1 so that it is vertically slidable therealong. The aforesaid connecting pin 8 is fixed to this slider 9. The slider 9 has a sleeve portion 10 having a cylindrical outer peripheral surface, and oppositely projecting portions 11 and 12. In addition, as is clear from FIG. 3, the slider 9 cannot be rotated relative to the front leg 1, being only vertically slidable.

A rotary yoke 13 is installed to surround the sleeve portion 10 of the slider 9. The rotary yoke 13 is formed with a cylindrical portion 14 having a cylindrical inner peripheral surface, said cylindrical portion 14 being rotated, whereby the rotary yoke 13 is supported for rotation around the central axis of the lower end of the front leg 1. The projections 11 and 12 are engaged with the cylindrical portion 14 from above, with the result that upward movement of the rotary yoke 13 brings about a movement of the slider 9 in the same direction. The rotary yoke 13 is provided with a bearing portion 17 for receiving the axle 16 of a wheel 15, said bearing portion being located at a position deviated from the central axis of the lower end of the front leg 1. In FIG. 3, the wheel is omitted from illustration, but, as can be seen from the configuration of the bearing portion 17, the wheel 15 and another one parallel thereto are supported on the same axle 16 on opposite sides of the rotary yoke 13. The rotary yoke 13 is provided with a pivot pin 18 and is formed with a guide hole 19 above said pivot pin 18. The guide hole 19 extends arcuately as a whole, having two recesses 20 and 21.

As previously mentioned, this embodiment includes an arrangement for stopping or reviving the inherent function of the caster. It is realized by an operating lever 22. The operating lever 22 is formed with an elongated pivot hole 23 for receiving the pivot pin 18. Further, a guide pin 24 adapted to be received in the guide hole 19 is fixed to the operating lever 22. The operating lever 22, as best seen in FIG. 3, has parallel walls capable of holding, e.g., the projection 12 of the slider 9 therebetween.

In the state shown in FIGS. 2 and 3, the operating lever 22 is engaged with the projection 12 of the slider 9, and since the slider 9 is incapable of rotation relative to the lower end of the front leg 1, the rotary yoke 13 cannot rotate relative to the lower end of the leg 1, either. Therefore, the direction of the wheel 15 remains fixed with respect to the front leg 1, and hence the inherent function of the caster has been stopped. The posture of the operating lever 22 in such state is maintained by the tension spring 25 urging the guide pin 24 into engagement with the recess 20.

In the state of FIG. 2, if the upper end of the operating lever 22 is forcibly moved to the right, the state shown in FIG. 4 can be obtained. That is, during this movement, the guide pin 24 goes up the slope from the recess 20 to the recess 21 against the force of the tension spring 25; when it crosses over the crest, it falls into the recess 21. In addition, the radial displacement of the guide pin 24 with respect to the pivot pin 18 is attended with a displacement of the operating lever 22 in the same direction, which displacement can be accommodated by the length dimension of the elongated pivot hole 23.

In the state of FIG. 4, the guide pin 24 is engaged with the recess 21 under the action of the tension spring 25, whereby the posture of the operating lever 22 is stably maintained. The operating lever 22 is no longer engaged with the projection 12. Therefore, the rotary yoke 13 is allowed to rotate around the sleeve portion 10. Thus, the wheel 15 is now free to change its direction, a fact which means that the inherent function of the caster has been revived.

When it is desired to stop the inherent function of the caster, this can be attained by forcibly moving the upper end of the operating lever 22 to the left in the state in which the projection 12 is aligned with the operating lever 22. In addition, it is also possible to engage the operating lever 22 with the other projection 11 by changing the direction of the wheel 15 shown in FIGS. 2 and 4 through 180°. At any rate, in each state where the operating lever 22 engages with the projection 11 or 12, the wheel 15 is aligned with the direction of travel of the baby carriage.

In each of the states shown in FIGS. 2 and 4, the caster is capable of exerting a cushioning effect. The load applied from the front leg 1 to the wheel 15 is first supported by the rotary yoke 13 through the axle 16 and then by the slider 9 through the projections 11 and 12 engaging the rotary yoke 13 from above. And the load on the slider 9 is transmitted to the spring engaging body 7 through the connecting pin 8. The spring engaging body 7 is vertically movable to the extent allowed by the movement of the connecting pin 8 in the elongated hole 2; the force of the cushion spring 6 on the engaging body 7 exerts a cushioning effect.

While the caster of this invention has been described with reference to the illustrated embodiment, other embodiments are also possible.

For example, the cushion effect applying member outwardly extending from within the lower end of the front leg 1 through the elongated hole 2 and having the function of engaging the rotary yoke from above has been composed of the connecting body 7, connecting pin 8 and slider 9. However, it may be composed of one or two parts rather than separating it into three parts.

In the illustrated embodiment, the lower end of the front leg 1 has been in the form of a quadrangular pipe. However, it may be a round pipe, whole outer peripheral surface is substituted for the sleeve portion 10, and the rotary yoke may be rotatably and movably installed at the lower end of the front leg without providing a slider 9. In this case, for example, the connecting pin 8 may be directly connected to the rotary yoke. Therefore, in this modified embodiment, said cushion effect applying member is composed of the spring engaging body 7 and the connecting pin 8.

Further, in the illustrated embodiment, the operating lever 22 has been provided for selectively stopping the inherent function of the caster, but such arrangement is not essential for the invention. Therefore, the projections 11 and 12 provided on the slider 9 in the illustrated embodiment may be designed to extend simply in flange form from the upper end of the sleeve portion 10. Further, even if a mechanism for stopping the inherent function of the caster is provided, its construction is not limited to the illustrated one; other suitable constructions may be used.

Although the present invention has been described and illustrated in detail, it is clearly understood that the same is by way of illustration and example only and is not to be taken by way of limitation, the scope of the present invention being limited only by the terms of the appended claims.

What is claimed is:

1. A caster for baby carriages, adapted to be attached to the lower end of a leg (1) of a baby carriage, characterized in that:
   at least the lower end of said leg (1) is fabricated of a hollow pipe and is vertically directed,
   a rotary yoke (13) held by the lower end of the leg (1) and supporting the axle (16) of a wheel (15) at a position deviated from the central axis of the lower end of said leg (1) is installed to surround the lower end of said leg (1) so that it is rotatable around the central axis of the lower end of the leg (1) and is vertically movable, the lower end of said leg (1) is provided with a vertically extending elongated hole (2), a cushion effect applying member (7, 8, 9) outwardly extends from within the lower end of said leg (1) through said elongated hole (2) to engage said rotary yoke (13) from above, and a cushion spring (6) is installed in the lower end of said leg (1) to impart a downward force to said cushion effect applying member.

2. A caster for baby carriages as set forth in claim 1, wherein:

said cushion effect applying member comprises a spring engaging body (7) disposed in the lower end of the leg (1) and engaging one end of said cushion spring (6), a connecting pin (8) extending from said spring engaging body (7) and through said elongated hole (2), and a slider (9) connected to said connecting pin (8) and disposed to be vertically slidable along the outer periphery of the lower end of said leg (1), said rotary yoke (13) is attached in a state in which it is directly engaged with said slider (9), said slider (9) comprises a sleeve portion (10) having a cylindrical outer peripheral surface allowing rotation relative to said rotary yoke (13), and a projection (11 or 12) engaging said rotary yoke (13) from above.

3. A caster for baby carriages as set forth in claim 2, including an operating lever (22) rotatably attached to said rotary yoke (13), said operating lever (22) being arranged so that when turned in one direction, it laterally engages the projection (11 or 12) on the slider (9).

4. A caster for baby carriages as set forth in claim 3, wherein said operating lever (22) is stably held in states in which it is in and out of engagement with said projection (11 or 12), respectively.

5. A caster for baby carriages as set forth in claim 4, wherein said operating lever (22) is rotatably held on said rotary yoke (13) by a combinatibn of a pivot pin (18) and an elongated pivot hole (23) for receiving said pivot pin (18), said pivot pin (18) being urged by a spring (25) to be positioned at one end of said elongated pivot hole (23), said operating lever (22) being provided with a guide pin (24), said rotary yoke (13) being provided with first and second recesses (20, 21) in which said guide pin (24) will fall under the action of said spring (25), the arrangement being such that when said guide pin (24) falls in said first recess (20), said operating lever (22) engages said projection (11 or 12) but when it falls in said second recess (21), said operating lever (22) does not engage said projection (11 or 12).

6. A caster for baby carriages as set forth in claim 1, wherein the lower end of said leg (1) has a pipe end (3) inserted therein and said pipe end (3) is formed with a spring stopper (5) for positioning said cushion spring (6).

* * * * *

UNITED STATES PATENT AND TRADEMARK OFFICE
CERTIFICATE OF CORRECTION

PATENT NO.   : 4,570,288
DATED        : February 18, 1986
INVENTOR(S)  : SPRING SUPPORTED CASTER HAVING A DISENGAGEABLE SWIVEL LOCK It is certified that error appears in the above-identified patent and that said Letters Patent are hereby corrected as shown below:

On the title page add:

[30] Foreign Application Priority Data

December 13, 1983 [JP] Japan    192674/1983[U]

Claim 5, column 6, line 11, replace "combinatibn" by --combination--.

Signed and Sealed this

Third Day of June 1986

[SEAL]

Attest:

DONALD J. QUIGG

Attesting Officer

Commissioner of Patents and Trademarks